(12) United States Patent
Sylvester et al.

(10) Patent No.: US 6,344,527 B1
(45) Date of Patent: Feb. 5, 2002

(54) METHOD FOR THE PRODUCTION OF POLYDIENES WITH REGULATED MOONEY VISCOSITY

(75) Inventors: Gerd Sylvester, Leverkusen; Günter Marwede, Köln, both of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/622,298

(22) PCT Filed: Feb. 6, 1999

(86) PCT No.: PCT/EP99/00803

§ 371 Date: Aug. 15, 2000

§ 102(e) Date: Aug. 15, 2000

(87) PCT Pub. No.: WO99/42503

PCT Pub. Date: Aug. 26, 1999

(30) Foreign Application Priority Data

Feb. 19, 1998 (DE) .......................... 198 06 931

(51) Int. Cl.$^7$ ............................. C08F 2/38; C08F 36/04
(52) U.S. Cl. .................... 526/90; 526/129; 526/164; 526/172; 526/335; 526/340.4; 526/901; 526/903
(58) Field of Search ................. 526/164, 901, 526/903, 90, 335, 340.4, 172, 129

(56) References Cited

U.S. PATENT DOCUMENTS

| | | | | |
|---|---|---|---|---|
| 3,297,667 A | * | 1/1967 | Von Dohlen et al. ... | 526/164 X |
| 4,663,405 A | * | 5/1987 | Throckmorton ......... | 526/164 X |
| 5,428,119 A | * | 6/1995 | Knauf et al. ............ | 526/164 X |
| 5,858,903 A | | 1/1999 | Sylvester et al. .......... | 647/118 |
| 5,908,904 A | | 6/1999 | Sylvester et al. .......... | 647/153 |
| 5,914,377 A | | 6/1999 | Sylvester et al. .......... | 736/164 |
| 6,001,478 A | * | 12/1999 | Apecetche et al. ..... | 526/164 X |

OTHER PUBLICATIONS

Jenkins, "Butadiene polymerization with a rare earth compound using a magnesium alkyl cocatalyst . . . ", Polymer, vol. 26(1), pp. 152–158, Jan. 1985.*

J. Anorg. Chem. Soc. 60 (2) Feb. 1938, pp. 309–319, Brunauer et al, Adsorption of Gases in Mutimolecular Layers.

J. of Colloid and Interface Sci. vol. 78, 31, Nov. 1980, M. P. McDaniel et al, Total Proposity Of High–Pore–Volume Silicas by Liquid Adsorption.

* cited by examiner

Primary Examiner—Fred Teskin
(74) Attorney, Agent, or Firm—Joseph C. Gil; Noland J. Cheung

(57) ABSTRACT

This invention relates to a process for the production of polydienes having controlled Mooney viscosity, carried out by means of catalysts based on rare earth compounds, which is characterized in that the conjugated dienes used are polymerized in the presence of from 0.005 to 80 wt. % of 1,2-dienes, based on the sum of conjugated dienes used and of 1,2-dienes used. The polydienes thus produced are used particularly in the manufacture of car tires.

6 Claims, No Drawings

METHOD FOR THE PRODUCTION OF POLYDIENES WITH REGULATED MOONEY VISCOSITY

This invention relates to a process for the production of polydienes having controlled Mooney viscosity which is carried out in the presence of metal catalysts of the rare earths and in the presence of specific molecular-weight controllers. The polydienes produced in this way are used in particular in the manufacture of car tires.

EP 0 647 657 discloses, inter alia, a process for the production of polydienes, according to which conjugated dienes are polymerised in the vapour phase by means of a supported catalyst based on rare earth compounds.

Furthermore, EP 0 736 549 discloses a process for the production in the vapour phase of diene rubbers, in which in the first step the dienes or mixtures of dienes are polymerised in a special way in the presence of a catalyst of the rare earths, so that a pourable diene rubber having a defined Mooney viscosity is obtained, and then in a second step the pourable diene rubber obtained is subjected in conventional manner to a degradative reaction, until a decreased Mooney viscosity is attained. The process described in EP 0 736 549 affords the possibility of producing diene rubbers with desired Mooney viscosities depending on the field of application, which have defined Mooney viscosities appropriate to the desired field of application.

Although the process described in EP 0 736 549 yields good results as regards the Mooney viscosities attainable in the diene rubbers, a technically simpler, more economical method of molecular weight control in the vapour phase process would be desirable.

Such a molecular weight control can be effected economically, in a technically simpler way, by the process according to the invention described in more detail below.

The present invention accordingly provides a process for the production of polydienes having controlled Mooney viscosity, carried out by means of catalysts based on rare earth compounds, which is characterised in that the conjugated dienes used are polymerised in the presence of from 0.005 to 80 wt. % of 1,2-dienes, based on the sum of conjugated dienes used and of 1,2-ienes used.

Examples of suitable conjugated dienes which can be used in the vapour phase process according to the invention, are 1,3-butadiene, isoprene, pentadiene and/or dimethylbutadiene, in particular 1,3-butadiene and isoprene. In the process according to the invention it is, of course, also possible to carry out the polymerisation in the presence of other monomers such as, for example, ethylene, propylene, butene, isobutylene, methylpentene, norbornene, cyclopentadiene, cyclohexene, styrene or chloroprene.

The quantities used of these monomers can vary within wide limits. In general, the quantity of additional monomers used is from 0.01 to 200 wt. %, based on conjugated diene used, preferably from 0.1 to 20 wt. %.

The 1,2-dienes used in order to control the Mooney viscosities are introduced in quantities of from 0.005 to 80 wt. %, preferably from 0.01 to 30, and particularly preferably from 0.05 to 10 wt. %, based on the sum of the conjugated dienes used and of 1,2-dienes used.

The required quantity of the controller according to the invention is dependent on various factors, for example, on the quantity of the catalysts used, the nature of the monomers used, the proportion of monomers in the reaction mixture, the reaction temperature and the pressure. It is easily possible, by appropriate preliminary experiments, to determine in each case the most suitable quantity of controller for the desired Mooney viscosity of the polymer.

Suitable 1,2-dienes are in particular those having boiling points below 140° C., preferably below 80° C., such as allene, 1,2-butadiene and 1,2-pentadiene or mixtures containing these 1,2-dienes.

The quantities, already specified above, of 1,2-dienes to be used are average values, that is, quantities which apply to the entire course of the reaction. This means, for example, that the controller according to the invention can be added in its entirety at the beginning of the polymerisation reaction, continuously throughout the whole course of the polymerisation or intermittently.

The process according to the invention is generally carried out at temperatures of from −20° C. to 250° C., preferably 20° C. to 160° C., particularly preferably 50° C. to 120° C., and at pressures of from 1 mbar to 50 bar, preferably at 0.5 to 30 bar, particularly preferably at 1 to 20 bar.

As already mentioned above, the process according to the invention is carried out in the presence of specially supported catalysts based on rare earth compounds. In this connection, the authors would also refer to the patent literature also already mentioned above, in which such catalysts are described and claimed.

The rare earth metal catalysts to be used for the process according to the invention consist, for example, of:

A) an alcoholate of the rare earths (I), a carboxylate of the rare earths (II), a complex compound of the rare earths with diketones (III) and/or an addition compound of the halides of the rare earths with an oxygen-donating compound or nitrogen-donating compound (IV) corresponding to the following formulae:

$(RO)_3M$   (I),

$(R-CO_2)_3M$   (II),

$(RCOCHCOR)_3M$   (III)

and

$MX_3 \cdot y$ donor   (IV),

B) an aluminiumtrialkyl, a dialkylaluminium hydride and/or an alumoxan corresponding to formulae (V) to (VII):

$Al\ R_3$   (V),

$HAlR_2$   (VI),

$R(AlO)_nAlR_2$   (VII)

wherein in the formulae

M denotes a trivalent element from among the rare earths having the atomic numbers 21, 39 or 57 to 71, R is identical or different and denotes alkyl groups having 1 to 10 carbon atoms, X represents chlorine, bromine or iodine y denotes 1 to 6 and n denotes 1 to 50, C) another Lewis acid and D) an inert, particulate solid having a specific surface of greater than 10 m²/g (BET) and a pore volume of 30 to 1,500 ml/g.

In component A, M denotes a trivalent element from among the rare earths having the atomic numbers 21, 39 or 57 to 71 according to the periodic system. Preferred compounds are those in which M denotes lanthanum, cerium, praseodymium or neodymium or a mixture of rare earth elements which contains at least one of the elements lanthanum, cerium, praseodymium or neodymium in a proportion of at least 10 wt. %. Compounds in which M denotes lanthanum or neodymium or a mixture of rare earths which contains at least 30 wt. % lanthanum or neodymium are particularly preferred.

Examples of groups R in formulae (I) to (IV) to be mentioned are in particular straightchain or branched alkyl groups having 1 to 20 carbon atoms, preferably 1 to 15 carbon atoms, such as methyl, ethyl, n-propyl, n-butyl, n-pentyl, isopropyl, isobutyl, tert. butyl, 2-ethylhexyl, neopentyl, neooctyl, neodecyl and neododecyl.

Examples to be mentioned of alcoholates used as component A are: neodymium(III) n-propanolate, neodymium (III) n-butanolate, neodymium(III) n-decanolate, neodyrnium(III) isopropanolate, neodymium(III) 2-ethylhexanolate, praseodymium(III) n-propanolate, praseodymium(III) n-butanolate, praseodymium(III) n-decanolate, praseodymium(III) isopropanolate, praseodymium(III) 2-ethylhexanolate, lanthanum(III) n-propanolate, lanthanum(III) n-butanolate, lanthanum(III) n-decanolate, lanthanum(III) isopropanolate, lanthanum(III) 2-ethylhexanolate, preferably neodymium(III) n-butanolate, neodymium(III) ndecanolate, neodymium(III) 2-ethylhexanolate.

The following carboxylates are suitable for use as component A: lanthanum(III) propionate, lanthanum(III) diethylacetate, lanthanum(III) 2-ethylhexanoate, lanthanum (III) stearate, lanthanum(III) benzoate, lanthanum(III) cyclohexanecarboxylate, lanthanum(III) oleate, lanthanum (III) versatate, lanthanum(III) naphthenate, praseodymium (III) propionate, praseodymium(III) diethylacetate, praseodymium(III) 2-ethylhexanoate, praseodymium(III) stearate, praseodymium(III) benzoate, praseodymium(III) cyclohexanecarboxylate, prascodymium(III) oleate, praseodymium(III) versatate, praseodymium(III) napbthenate, neodymium(III) propionate, neodymium(III) diethylacetate, neodymium(III) 2-ethylhexanoate, neodymium(III) stearate, neodymium(III) benzoate, neodymnium(III) cyclohexane-carboxylate, neodymium (III) oleate, neodymium(III) versatate, neodymium(III) naphthenate, preferably neodymium(III) 2-ethylhexanoate, neodymium(III) versatate, neodymnium(III) naphthenate. Neodymium versatate is particularly preferred.

Complex compounds used as component A which may be mentioned: lanthanum(III) acetylacetonate, praseodymiium (III) acetylacetonate, neodymium(III) acetylacetonate, preferably neodymium(III) acetylacetonate.

Examples to be mentioned of addition compounds used as component A with donors are: lanthanum(III) chloride with tributylphosphate, lanthanum(III) chloride with tetrahydrofuran, lanthanum(III) chloride with isopropanol, lanthanum(III) chloride with pyridine, lanthanum(III) chloride with 2-ethylhexanol, lanthanum(III) chloride with ethanol, praseodymium(III) chloride with tributylphosphate, praseodymium(III) chloride with tetrahydrofuran, praseodymium(III) chloride with isopropanol, praseodymium(III) chloride with pyridine, praseodymium(III) chloride with 2 ethylhexanol, praseodymium(III) chloride with ethanol, neodymium(III) chloride with tributylphosphate, neodymium(III) chloride with tetrahydrofuran, neodymium(III) chloride with isopropanol, neodymium(III) chloride with pyridine, neodymium(III) chloride with 2-ethylhexanol, neodymium(III) chloride with ethanol, lanthanum(III) bromide with tributylphosphate, lanthanum(III) bromide with tetrahydrofiuran, lanthanum (III) bromide with isopropanol, lanthanum(III) bromide with pyridine, lanthanum(III) bromide with 2-ethylhexanol, lanthanum(III) bromide with ethanol, praseodymium(III) bromide with tributylphosphate, praseodymium(III) bromide with tetrahydrofuran, praseodymium(III) bromide with isopropanol, praseodymium(III) bromide with pyridine, praseodymium(III) bromide with 2-ethylhexanol, praseodymium(III) bromide with ethanol, neodymium(III) bromide with tributyiphosphate, neodymium(III) bromide with tetrahydrofyiran, neodymium(III) bromid with isopropanol, neodymium(III) bromide with pyridine, neodymium(III) bromide with 2-ethylhexanol, neodymium (III) bromide with ethanol, preferably lanthanum(III) chloride with tributyl phosphate, lanthanum(III) chloride with pyridine, lanthanum(III) chloride with 2-ethylhexanol, praseodymium(III) chloride with tributylphosphate, praseodymium(III) chloride with 2-ethylhexanol, neodymium(III) chloride with tributylphosphate, neodymium(III) chloride with tetrahydrofuran, neodymium (III) chloride with 2-ethylhexanol, neodymium(III) chloride with pyridine, neodymium(III) chloride with 2-ethylhexanol, neodymium(III) chloride with ethanol.

The rare earth compounds may be used separately or mixed with one another.

Compounds particularly preferably used as component A are neodymium versatate, neodymnium octanoate, the addition compounds of neodymium chloride with tributyl phosphate and/or neodymium naphthenate.

In formulae (V) to (VII) for component B, R denotes a straight-chain or branched alkyl group having 1 to 10 C atoms, preferably 1 to 4 C atoms. Examples of suitable aluminium alkyls corresponding to formulae (V) and (VI) are:

trimethylaluminium, triethylaluminium, tri-n-propylaluminium, triisopropylaluminium, tri-n-butylaluminium, triisobutylaluminium, tripentylaluminium, trihexyl-aluminium, tricyclohexylaluminium, trioctylaluminium, diethylaluminium hydride, di-n-butylaluminium hydride and diisobutylaluminium hydride. Triethylaluminium, tri-isobutylaluminium and diisobutylaluminium hydride are preferred. Diisobutylaluminium hydride is particularly preferred.

Examples of alumoxans (VII) to be mentioned are: methylalumoxan, ethylalumoxan and isobutylalumoxan, preferably methylalumoxan and isobutylalumoxan.

So-called Lewis acids are used as component C. Examples which may be mentioned are the organometallic halides in which the metal atom belongs to group 3a) or 4a), as well as halides of the elements of groups 3 a), 4 a) and 5 a) of the periodic system, as described in the "Handbook of Chemistry and Physics", 45 th Edition, 1964–65. The following are mentioned in particular:

methylaluminium dibromide, methylaluminium dichloride, ethylaluminium dibromide, ethylaluminium dichloride, butylaluminium dibromide, butylaluminium dichloride, dimethylaluminium bromide, dimethylaluminium chloride, diethyl-aluminium bromide, diethylaluminium chloride, dibutylaluminium bromide, dibutylaluminium chloride, methylaluminium sesquibromide, methylaluminium sesquichloride, ethylaluminium sesquibromide, ethylaluminium sesquichloride, aluminium tribromide, antimony trichloride, antimony pentachloride, phosphorus trichloride, phosphorus pentachloride, tin tetrachloride.

Diethylaluminium chloride, ethylaluminium sesquichloride, ethylaluminium dichloride, diethylaluminium bromide, ethylaluminium sesquibromide and/or ethylaluminium dibromide are preferably used.

Other compounds which can be used as Component C are the reaction products of aluminium compounds of the type described as component B with halogens or halogen compounds, for example, triethylaluminium with bromine or triethylaluminium with butyl chloride. In this case, the reaction can be carried out separately, or the quantity of the allylaluminium compound required for the reaction is added to the quantity required for use as component B.

Ethylaluminium sesquichloride, butyl chloride and butyl bromide are preferred.

Component C can be dispensed with if component B is a compound corresponding to formula VII or when a compound corresponding to formula IV is used as component A.

Substances used as component D are inert, particulate solids having a specific surface greater than 10 m$^2$/g, preferably 10 to 1,000 m$^2$/g (BET), and a pore volume of 0.3 to 15 ml/g, preferably of 0.5 to 12 ml/g.

The specific surface (BET) is determined in conventional manner by the method of S. Brunauer, P. H. Emmet and Teller, J. Anorg. Chem. Soc. 60 (2), 309 (1938). The pore volume is determined by the centrifugation method of M. McDaniel, J. Colloid Interface Sci. 78, 31 (1980).

Suitable inert solids are in particular silica gels, precipitated silicas, clays, aluminosilicates, talc, zeolites, carbon black, activated carbons, inorganic oxides such as silicon dioxide, aluminium oxide, magnesium oxide, titanium dioxide, silicon carbide, polyethylene, polystyrene or polypropylene, preferably silica gels, precipitated silicas, zeolites, polystyrene, polypropylene and carbon black, particularly preferably silica gel, precipitated silicas, polypropylene and carbon black. In this case, by inert it is meant that the solids neither have a reactive surface nor contain adsorbed material which prevents the formation of an active catalyst or reacts with the monomers.

The above-mentioned inert inorganic solids which meet the above specification and are therefore suitable for use are described in more detail, for example, in Ullmann, Enzyklopädie der technischen Chemie, Volume 21, p. 439 ff. (silica gels), Volume 23, p. 311 ff. (clays), Volume 14, p. 633 ff. (carbon blacks), Volume 24, p. 575 ff. and Volume 17, p. 9 ff. (zeolites).

The inorganic solids may be used separately or mixed with one another.

The molar ratio in which the catalyst components A to D are used can vary within wide limits.

The molar ratio of component A to component B is generally 1:1 to 1:1000, preferably 1:3 to 1:200, particularly preferably 1:3 to 1:100. The molar ratio of component A to component C is 1:0.4 to 1:15, preferably 1:0.5 to 1:8.

0.1 mMol. to 1 Mol. component A, preferably 1 to 50 mMol. component A, is used per 100 g component D.

It is also possible to add yet another component E to the catalyst components A to D. This component E is a conjugated diene, which can be the same diene as the one which is later to be polymerised using the catalyst. Preferably butadiene and isoprene are used.

If component E is added to the catalyst, the quantity of E is preferably 1 to 1,000 mol., based on 1 mol. of component A, particularly preferably 1 to 100 mol., based on 1 mol. of component A. Most preferably 1 to 50 mol. of E, based on 1 mol. of component A, is used.

The production of the supported rare earth metal catalyst to be used is described, for example, in EP 647 657 and the carrying out of the process in the vapour phase by means of the above-mentioned catalysts is described in EP 0 736 549.

The quantity of the catalyst used is generally from 0.01 to 10 wt. %, in particular 0.1 to 5 wt. %, based on the monomers used.

The most suitable quantity in each case is easy to ascertain by means of appropriate preliminary experiments.

The process according to the invention can be carried out both continuously and batchwise in the conventional reactors suitable for the purpose.

Preferably, the process according to the invention is carried out in the vapour phase.

As mentioned above, the controller according to the invention can be added, for example, at the start of the reaction or continuously or intermittently during the reaction.

Suitable reactors are, for example, stirred-tank reactors, rotary reactors, stirred-tank/rotary reactors, mixing-nozzle reactors, fluidised-bed reactors.

The controllers according to the invention can be added optionally together with inert diluents, such as alkanes, for example, methane, ethane, propane, butane and/or pentane, or with nitrogen or argon. They can also be fed into the reaction chamber in solid form absorbed on solids. Suitable solids are, for example, the same substances as those which can be used as catalyst supports. The quantity of inert diluents or mixture of inert diluents is likewise easy to determine by appropriate preliminary experiments.

Solvents or powders can be introduced into the reaction chamber in order to improve the pourability.

The polydienes obtained by the process according to the invention have a high 1,4-cis content (approximately 60 to 99.9%) and are mainly in pourable, non-agglutinated form. The average particle diameter of the polymers can be up to several centimeters. The average particle diameter is preferably from 0.05 to 1.5 cm.

The polydienes obtained have average Mooney values (ML 1+4', 100° C.) of from 30 to 180 Mooney units, preferably 50 to 70 Mooney units.

The polymers obtained according to the invention can be stabilised, compounded and vulcanised in the known manner. They are used primarily for manufacturing car tires.

EXAMPLE 1 a) Preliminary Treatment of the Support:

Zeosil 1165 MP was used as the support. Zeosil 1165 MP is a precipitated silica which is produced by the company Rhone-Poulenc and has an average particle size of 252 μm and a surface area (BET) of 139 m$^2$/g. The pore volume is 1.97 ml/g. Prior to use, the Zeosil 1165 MP was dried at 900° C. under a countercurrent of nitrogen and packed with the exclusion of air and moisture.

b) Production of the Catalyst:

A catalyst was produced by mixing together 120 ml dry n-hexane, 150 mMol. diisobutylaluminium hydride (DIBAH) and 5.0 mMol. ethylaluminium sesquichloride (EASC) in a 1 l flask, equipped with a supply of N$_2$ and a magnetic stirrer. After 1.25 g butadiene had been introduced into the solution, 5.0 mMol. neodymium versatate (NDV) was added. The resulting mixture was added to a suspension in 200 ml n-hexane of 100 g of the support described under a). After 5 minutes the batch was evaporated to dryness in a vacuum. 106 g of a free-flowing powder was isolated.

c) Preparation of the Solvent:

A solution of 25 mMol. DIBAH, dissolved in 300 ml hexane, was added to 100 g Vulkasil S and the resulting mixture was evaporated to dryness in a vacuum, with stirring.

Polymerisation:

The polymerisation was carried out in a rotary evaporator equipped with a magnetic stirring rod, a mercury pressure-control valve and connections to a vacuum pump and for the supply of gaseous nitrogen and butadiene as well as with a thermnosensor reaching almost to the bottom of the 1 flask. The inclination of the rotary evaporator was adjusted in such a way that the axis of rotation formed an angle of 45° with that of the magnetic rod. The total volume of the apparatus was 2 liters. The apparatus was connected via an adjustable valve to a pressure cylinder positioned on a balance; the pressure cylinder contained the controller/monomer mixture. The valve was opened when the pressure in the apparatus had fallen to 900 mbar and was closed when a pressure of 950 mbar was exceeded.

9.8 g of the catalyst and 8 g of the solvent prepared under 1c were introduced into the flask, under nitrogen. The apparatus was evacuated to 1 mbar and filled up, with stirring and rotation, with a gaseous mixture of 1,2- and 1,3-butadiene until a pressure of 950 mbar was attained. This mixture had been prepared by introducing 1.5 g 1,2-butadiene and 301 g 1,3-butadiene into a 1 liter pressure cylinder. The temperature rose to 34° C. within one minute.

By means of a blower which emitted hot air at an adjustable temperature, the apparatus was heated in such a way that the bed was maintained at a temperature of 60° C. After 6 hours the reaction was concluded. The yield was 154.1 g. The polymer was shortstopped and stabilised with 1 g Vulkanox BKF (a product of Bayer AG), dissolved in 200 ml acetone. The excess acetone was removed under vacuum. The Mooney viscosity was 50 Mooney units. Content of cis-1,4-double bonds: 96.5%.

EXAMPLE 2

The polymerisation was carried out in the same manner as in Example 1. 9.3 g of the catalyst described under 1b) and 14.9 g of the solvent described under 1c) were used. The polymerisation was carried out at 60° C., using a mixture which had been prepared from 3 g 1,2-butadiene and 298 g 1,3-butadiene. The polymerisation was terminated after 4 hours. The yield was 138.9 g. The polymer was stabilised with 0.6 g Vulkanox BKF. The Mooney viscosity was 19 Mooney units.

EXAMPLE 3

The polymerisation was carried out in the same manner as in Example 1. 10.6 g of the catalyst described under 1b) and 10.6 g of the solvent described under 1c) were used. The polymerisation was carried out at 90° C., using a mixture which had been prepared from 0.75 g 1,2-butadiene and 299 g 1,3-butadiene. The polymerisation was terminated after 3.5 hours. The yield was 185 g. The polymer was stabilised with 0.9 g Vulkanox BKF. The Mooney viscosity was 21 Mooney units.

COMPARISON EXAMPLE

The polymerisation was carried out in the same manner as in Example 1. 9.5 g of the catalyst described under 1b) and 8.7 g of the solvent described under 1c) were used. The polymerisation was carried out at 60° C. using only 1,3-butadiene, without the addition of 1,2-butadiene The polymerisation was terminated after 4 hours. The yield was 380 g. The polymer was stabilised with 2 g Vulkanox BKF. The Mooney viscosity was 111 Mooney units.

What is claimed is:

1. Process for the production of polydienes having controlled Mooney viscosity, carried out by means of supported catalysts based on rare earth compounds, comprising the step of polymerizing conjugated dienes in the presence of from 0.005 to 80 wt. % of 1,2-dienes, based on the sum of conjugated dienes used and of 1,2-dienes used.

2. Process according to claim 1, wherein said conjugated dienes used are selected from the group consisting of 1,3-butadiene, isoprene, pentadiene and dimethylbutadiene.

3. Process according to claim 1, wherein said process is carried out at temperatures of from −20° C. to 250° C. and at pressures of from 1 mbar to 50 bar.

4. Process according to claim 1, wherein said catalysts are used in quantities of from 0.01 to 10 wt. %, based on the monomers used.

5. Process according to claim 1, wherein said step of polymerizing conjugated dienes is carried out in the vapour phase.

6. Process according to claim 1, wherein said catalysts are selected from the group consisting of:

A) an alcoholate of the rare earths (I), a carboxylate of the rare earths (II), a complex compound of the rare earths with diketones (III) and/or an addition compound of the halides of the rare earths with an oxygen-donating compound or nitrogen-donating compound (IV) corresponding to the following formula:

and

B) an aluminiumtrialkyl, a dialkylaluminium hydride and/or an alumoxane corresponding to formulae (V) to (VII):

wherein in the formulae
M denotes a trivalent element from among the rare earths having the atomic numbers 21, 39 or 57 to 71,
R is identical or different and denotes alkyl groups having 1 to 10 carbon atoms,
X represents chlorine, bromine or iodine
y denotes 1 to 6 and
n denotes 1 to 50,
C) another Lewis acid and
D) an inert, particulate solid having a specific surface of greater than 10 m$^2$/g (BET) and a pore volume of 30 to 1,500 ml/g.

* * * * *